(12) United States Patent
Hemp et al.

(10) Patent No.: US 11,906,800 B2
(45) Date of Patent: Feb. 20, 2024

(54) HIGH SPEED NETWORK DEVICE WITH ORTHOGONAL PLUGGABLE OPTICS MODULES

(71) Applicant: Arista Networks, Inc., Santa Clara, CA (US)

(72) Inventors: Adam Hemp, Belmont, CA (US); Youngbae Park, Milpitas, CA (US); Warren Meggitt, Los Altos, CA (US); Andreas Bechtolsheim, Incline Village, NV (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/705,236

(22) Filed: Mar. 25, 2022

(65) Prior Publication Data
US 2023/0305249 A1  Sep. 28, 2023

(51) Int. Cl.
*H04B 10/00* (2013.01)
*G02B 6/42* (2006.01)
*H04B 10/40* (2013.01)
*H04B 10/80* (2013.01)

(52) U.S. Cl.
CPC .......... *G02B 6/4284* (2013.01); *G02B 6/4261* (2013.01); *G02B 6/4269* (2013.01); *H04B 10/40* (2013.01); *H04B 10/801* (2013.01)

(58) Field of Classification Search
CPC .. G02B 6/4284; G02B 6/4261; G02B 6/4269; H04B 10/40; H04B 10/801
See application file for complete search history.

(56) References Cited

U.S. PATENT DOCUMENTS

| | | | | |
|---|---|---|---|---|
| 8,482,917 B2* | 7/2013 | Rose | ................. | H05K 7/20727 |
| | | | | 361/679.48 |
| 10,271,461 B2* | 4/2019 | Schmidtke | ......... | H05K 7/20736 |
| 10,568,238 B1* | 2/2020 | Leung | ................ | H05K 7/20736 |
| 10,582,639 B1* | 3/2020 | Chopra | .............. | H05K 7/20636 |

(Continued)

OTHER PUBLICATIONS

Cole et al., "Datacenter Optical Transceivers in the Next Decade—Tu3C: High Performance Computer Networks and High Throughput Transceivers", ECOC 2022 Basel, Sep. 20, 2022, 75 pages.

(Continued)

*Primary Examiner* — Agustin Bello
(74) *Attorney, Agent, or Firm* — Fountainhead Law Group P.C.

(57) ABSTRACT

The present disclosure describes a network switch design that includes a vertical switch circuit board that is mounted parallel to the front panel of the network switch. The vertical circuit board supports switch chip(s) to process and forward packets and optical module connectors to receive pluggable optics modules that provide connections to other network switches. The arrangement of the circuit board, switch chip(s) and optical module connectors achieves reduced lengths for the electrical signal traces that connect the switch chip(s) to the optical module connectors. In addition, the design improves cooling by providing separate airflow regions between the switch chip heatsink(s) and the optics modules. The vertical switch card assembly and its components can be made removable from the front panel for ease of servicing.

20 Claims, 14 Drawing Sheets

(56) References Cited

U.S. PATENT DOCUMENTS

| | | |
|---|---|---|
| 11,058,034 B2 * | 7/2021 | Leung .................. H05K 7/1492 |
| 2012/0120596 A1 | 5/2012 | Bechtolsheim |
| 2014/0098492 A1 * | 4/2014 | Lam ................... H05K 7/20727 |
| | | 165/104.34 |
| 2015/0139223 A1 * | 5/2015 | Mayenburg .......... H05K 5/0213 |
| | | 370/357 |
| 2017/0332519 A1 * | 11/2017 | Schmidtke ......... H05K 7/20736 |
| 2019/0208290 A1 * | 7/2019 | Olson ...................... H04Q 1/13 |
| 2019/0307014 A1 * | 10/2019 | Adiletta ................... H04L 67/10 |
| 2020/0073061 A1 | 3/2020 | Leigh et al. |
| 2021/0096306 A1 | 4/2021 | Raza et al. |
| 2021/0211785 A1 * | 7/2021 | Rose ........................ H04Q 1/04 |
| 2022/0029380 A1 | 1/2022 | Kovsh et al. |
| 2022/0141949 A1 * | 5/2022 | Devalla .................. H05K 1/141 |
| | | 361/721 |
| 2022/0159860 A1 * | 5/2022 | Winzer .................. G02B 6/428 |
| 2022/0244465 A1 * | 8/2022 | Winzer ................ G02B 6/3608 |
| 2022/0263586 A1 * | 8/2022 | Winzer ................ G02B 6/4246 |
| 2022/0264759 A1 * | 8/2022 | Sawyer ................... G06F 1/183 |
| 2022/0279256 A1 * | 9/2022 | Chaouch ............. H04B 10/801 |

OTHER PUBLICATIONS

International Search Report and Written Opinion, International Searching Authority, PCT Application No. PCT/US2023/063750, dated Aug. 18, 2023, 17 pages.

* cited by examiner

HIGH SPEED NETWORK DEVICE WITH ORTHOGONAL PLUGGABLE OPTICS MODULES

SPECIFICATION

BACKGROUND

The present disclosure relates to the field of computer network systems, and in particular to the design of network switches for high-speed network switching and routing systems.

Network switches (also known as routers, switching hubs, or simply "switches") are computer networking devices that generally use packet switching to receive, process, and forward data in computer networks. Network switches typically have a number of interface ports that can be individually configured with different types of pluggable optical transceivers or electrical cables to connect to other network switches or devices.

Network switches are typically built with a circuit card that includes one or more switch chips, which perform packet processing, and multiple interface ports. The interface ports typically utilize industry standardized pluggable optical transceiver module form factors such as SFP (Small Form Factor Pluggable), QSFP (Quad Small Form Factor Pluggable), QSFP-DD (QSFP Dual Density), OSFP (Octal Small Form Factor Pluggable), or OSFP-XD (OSFP Extended Density).

The signaling speed for the electrical lanes connecting the switch chips to the interface ports has increased significantly in the last few years from 10 Gbps (Gigabits per second) to 100 Gbps, or 112 Gbps including coding overhead for forward error correction. With PAM4 (Pulse Amplitude Modulation 4-level) modulation, the corresponding signaling rate is 56 Gbaud (Giga-baud) and the Nyquist frequency is 28 GHz.

Next-generation networking systems are expected to use electrical lanes with a nominal data rate of 200 Gbps per lane, or approximately 224 Gbps including coding overhead for forward error correction. With PAM4 modulation, a 224 Gbps data rate translates to a signaling rate of 112 Gbaud with a Nyquist frequency of 56 GHz.

Doubling the data rate of the electrical lanes from 112 to 224 Gbps roughly doubles the losses across printed circuit boards traces, which in turn means that signals at twice the speed will only travel approximately half as far across a printed circuit board. This reduced electrical signal reach is no longer compatible with conventional switch card layouts where the trace length from the switch chip to the most distant interface port is typically at least 10 inches.

One solution to this problem is to use coaxial cables that have far lower insertion losses than printed circuit traces to connect the switch chip to the interface ports. However such cables, also known as "flyover cables," add significant costs, are challenging to manufacture, and can impede airflow within the device enclosure.

A second solution to the problem is to use on-board optics, which are placed on the switch card very close to the switch chip thereby reducing the electrical trace length between the switch chip to the optics module to a minimum. On-board optics modules present a serviceability challenge because they cannot be replaced upon failure without opening the network chassis to get access to the module. In addition, on-board optics require additional fiber connections from the on-board optics module to the front-panel optical connector, which add significant cost and cause additional optical signal losses. As a result, on-board optics have not been widely adopted by the industry.

A third solution to the problem is the use of so-called co-packaged optics (CPOs), which place the optical modulator directly on the switch chip package. This minimizes the length of the electrical channel between the switch chip and the optics and allows the electrical channel to operate at lower power levels. However, co-packaged optics have their own significant challenges, including reliability, serviceability, manufacturability, and the ability to mix and match different optics technologies. Like on-board optics, co-packaged optics also require additional fiber connections to the front panel which add cost and cause optical signal losses. As a result, co-packaged optics have not been widely adopted by the industry.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
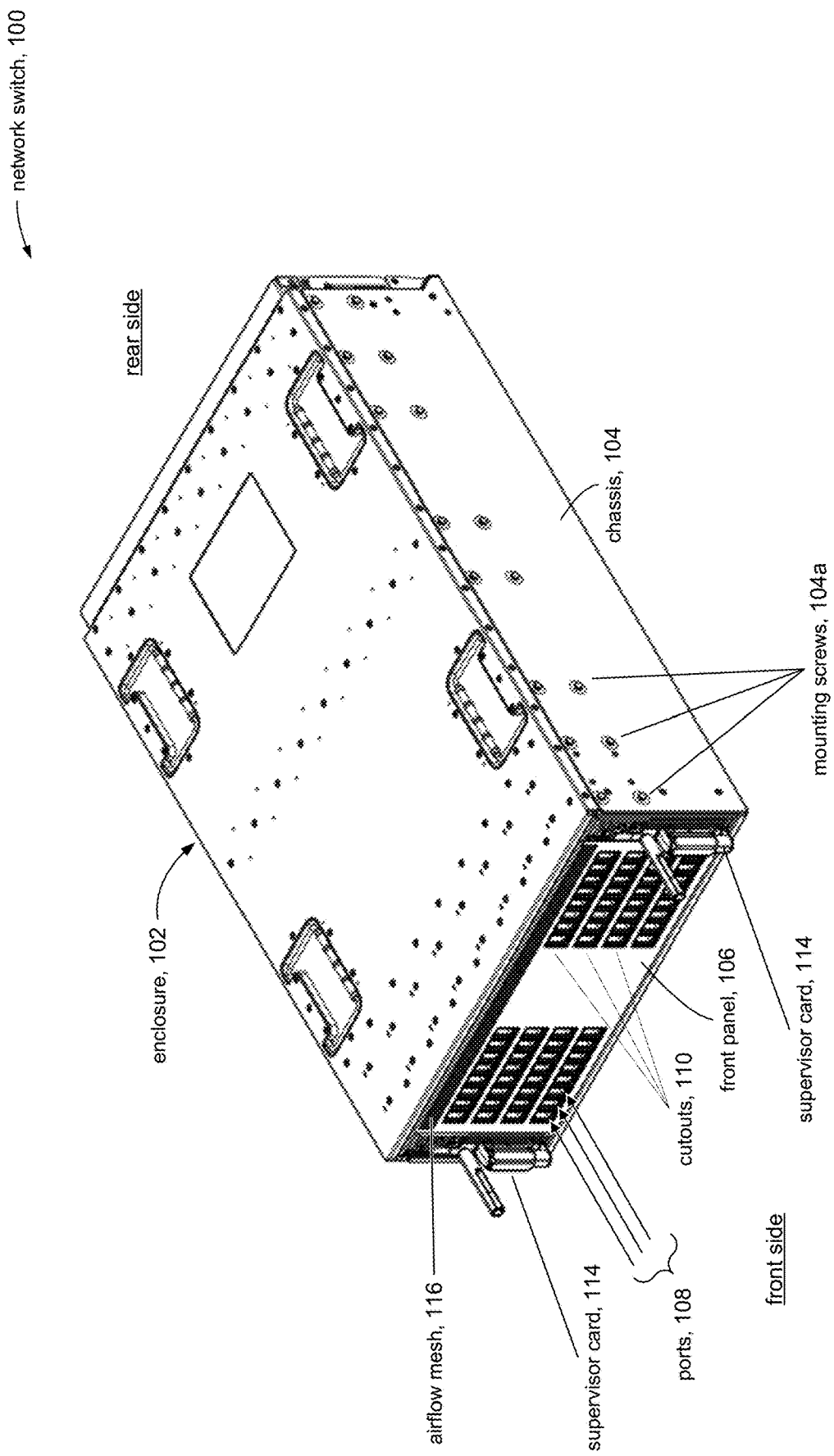
FIG. 1 shows an example network switch in accordance with the present disclosure.

As explained above, known design approaches do not provide a satisfactory low-cost solution for the interconnection between high-speed switch chips and interface ports using printed circuit board traces at speeds of 200 Gbps or above. An objective of the present disclosure is to allow for the design of such high-speed network switches with electrical data transmission speeds of 200 G and above using printed circuit board traces, without the need for flyover cables, on-board optics, or co-packaged optics.

It is an objective of the present disclosure to provide a switch circuit board design that minimizes the trace length of the electrical channels for all the benefits that result from a shorter electrical channel, including lower signal loss and better signal margins.

It is a further object of the present disclosure to provide an efficient method of good air cooling to both the switch chip and the optics modules in a network switch chassis.

It is still another object of the present disclosure to reduce the size of the switch circuit card to reduce cost.

Other objects and advantages of the disclosure will become apparent as the description proceeds.

Vertical SCA In one aspect of the present disclosure, the network switch comprises a switch card assembly (SCA) that includes a switch printed circuit board (PCB) with one or more switch chips, interface ports, and supporting circuitry. The switch chips provide the network switching function among the interface ports.

In accordance with an embodiment of the present disclosure, the interface port connectors and cages for the pluggable optics modules (POM) are mounted on the SCA to receive the pluggable optics modules. The POM connectors are mounted in an orthogonal relation to the surface of the Switch PCB. When the Switch PCB is housed in a network switch chassis, the Switch PCB lies in a plane co-planar to the front panel, and the front ends of the POM connectors and cages are directly accessible from the front panel. This arrangement allows the pluggable optics modules to be inserted through the front panel and received by the connectors to connect directly to the Switch PCB that carries the switch chips.

The orthogonal orientation of the POM connectors relative to the Switch PCB allows for a higher density of pluggable optics modules to be deployed closer to the switch chips than in conventional designs. This allows the electrical connections between the switch chip and the POM connectors to be made with printed circuit traces that are sufficiently short in length so as to enable high-speed signaling (e.g., 200 Gbps), rather than having to use the more costly alternatives (e.g., fly-over cables, fiber optics) described above.

By comparison, in a conventional switch design, the pluggable optics modules are arranged along the edge parallel relative to the switch motherboard. The pluggable optics modules that are furthest from the switching chips have longer printed circuit traces to the switching chips. At very high signaling speeds, the electrical channel with printed circuit board traces no longer works for the longer traces. As a result, solutions such as coaxial cables or on-board optics with fiber optic cables are required, which are significantly more costly compared to PCB traces. In addition, on-board optics compared to pluggable optics present many additional challenges in terms of configurability, reliability, serviceability, and manufacturability.

Airflow, $1^{st}$ Aspect In another aspect of the present disclosure, the SCA includes a heat sink assembly comprising a heat collector (heat plate) connected to a heat dissipator (heatsink fins) via heat transfer conduits. The heat collector is in thermal contact with the one or more switch chips to absorb the heat generated by the switch chips and transfer that heat to the heat dissipator via the thermal conduit. In accordance with the present disclosure, the heat dissipator is positioned along the width of the upper edge of the Switch PCB near the front panel of the chassis, directly in the path of the airflow. Ambient air from the outside is pulled by fans, located in the rear of the chassis, across the heat dissipator and into the rear air space (air plenum) of the network switch chassis, from which the heated air is exhausted from the chassis. Accordingly, the switch chips are cooled with air at ambient air temperature rather than with air that is preheated from the optics modules as in conventional switch chassis designs.

In a conventional design, the one or more switch chips are downstream of the pluggable optics modules in the center of the network switch chassis. As such, ambient airflow passes across and cools the pluggable optics modules before entering the space occupied by the switch chips. Accordingly, the air used to cool the switch chips has been preheated by the pluggable optics modules, resulting in less effective cooling of the switch chips.

Airflow, $2^{nd}$ Aspect In another aspect of the present disclosure, the Switch PCB includes slotted openings (cutouts) through the Switch PCB where the POM cages are mounted. Each POM cage includes one or more airflow channels that substantially align with the slotted openings formed through the Switch PCB. The air channels in the POM cage allow ambient air to be drawn into the POM connector, flow across a pluggable optics module received in the POM connector, and exit through the Switch PCB opening into the air plenum space, from which the heated air is exhausted from the chassis.

Power delivery In another aspect of the present disclosure, a point of load power converter PCB is located behind the Switch PCB to deliver power to the circuitry on the Switch PCB. Electric current from the power PCB can be provided to the Switch PCB via copper slugs sandwiched between the power PCB and the Switch PCB. The power PCB has cutouts substantially in line with the cutouts in the Switch PCB to allow the air to flow through both the Switch PCB and the Power PCB.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 shows a network switch 100 in accordance with the present disclosure. Network switch 100 can be any packet processing and forwarding equipment that has network traffic switching, routing, or other network traffic forwarding capabilities and can be a switch, router, bridge, gateway, and the like. In some embodiments, network switch 100 includes an enclosure (housing, etc.) 102 to house the components that comprise the device. The enclosure 102 comprises a chassis 104 and a front panel (faceplate) 106. In some embodiments, chassis 104 can be configured for rack mounting (e.g., via mounting screws 104a), for example, in a 19-inch rack, a 23-inch rack, and the like.

Network switch 100 provides physical interface ports 108 to enable connections to other network switches or devices such as servers and storage. Front panel 106 has port access cutouts (openings) 110 formed through the front panel. Port access cutouts 110 provide access to physical ports 108 for receiving data cables such as Ethernet cables, fiber optic cables, etc. In accordance with some embodiments, physical ports 108 are configured to receive removable pluggable optics modules (e.g., FIG. 6).

In accordance with the present disclosure, front panel 106 further includes an airflow mesh 116 comprising an arrangement of openings formed through the front panel to remove heat generated by one or more switch chips of network switch 100. Network switch 100 includes fans (e.g., FIG. 5) to draw ambient air from the front side of the network switch, through the openings (110, 116) of front panel 106, into chassis 104, across the interior volume of the chassis, and out of the chassis through exhaust openings at the rear side of the chassis.

Figure 2:
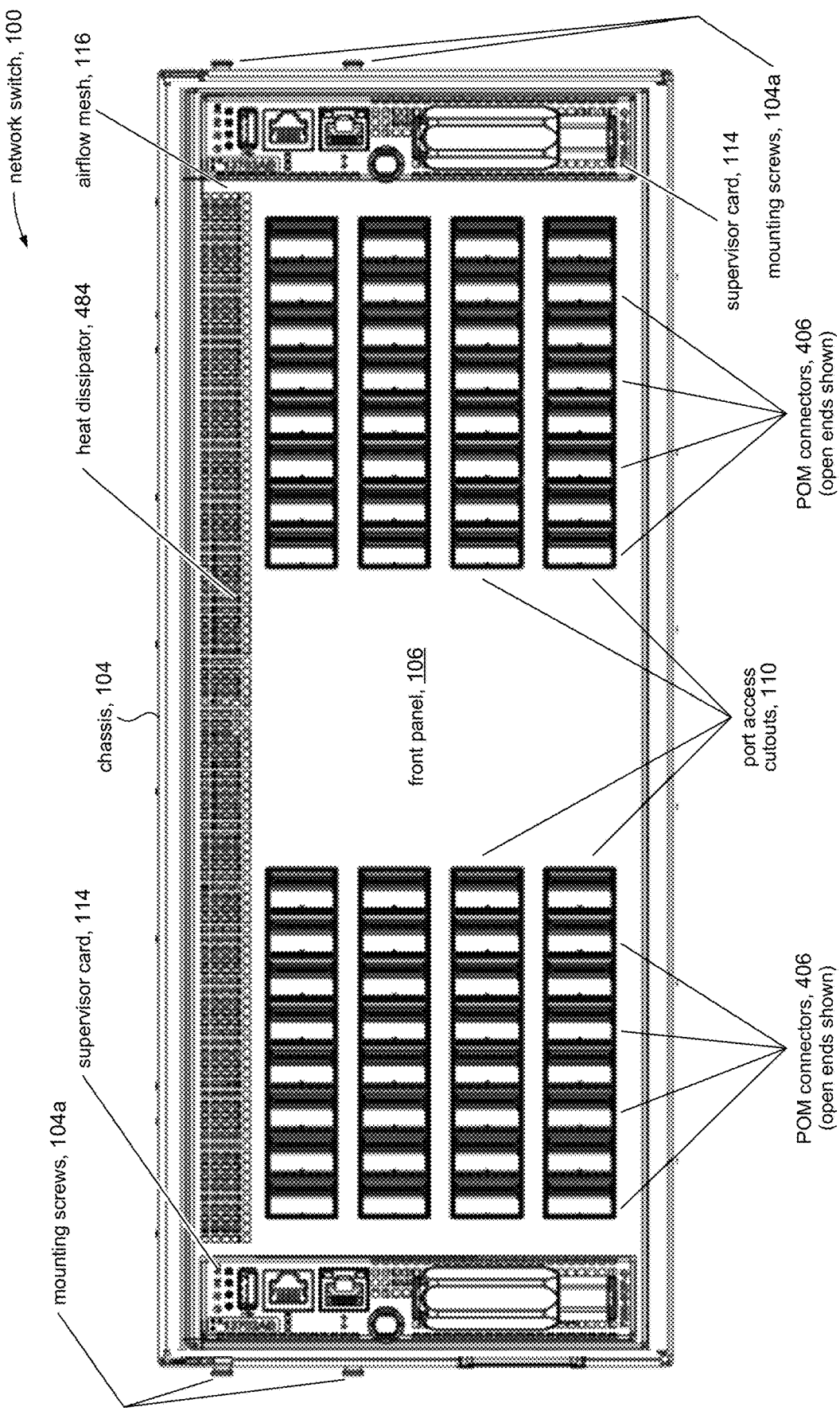
FIG. 2 shows a front-facing view of the example network switch.

FIG. 2 shows a front-facing view of network switch 100. The figure depicts a heat dissipator component 484 (FIG. 4A) of a heatsink assembly in accordance with the present disclosure to cool the switch chip(s) of network switch 100. Heat dissipator 484 is disposed within chassis 104 of the network switch behind the airflow mesh 116. In accordance with the present disclosure, heat dissipator 484 is directly exposed to ambient air that is drawn in through airflow mesh 116 by fans in the rear of the chassis. In other words, ambient airflows across heat dissipator 484 without first passing across other electronic devices that would increase the temperature of the ambient air.

FIG. 2 further shows that open ends of pluggable optical module (POM) connectors 406 (FIG. 4A) are exposed through port access cutouts 110. As can be seen in the figure, the open ends of the POM connectors are exposed to ambient air. Accordingly, a flow of ambient air that is drawn in through the port access cutouts will flow through the interior space of POM connectors 406 and provide cooling of pluggable optics modules (not shown) plugged into the POM connectors. As such, and in accordance with the present disclosure, ambient airflow drawn in across front panel 106 can be viewed as having two zones: a first airflow zone through airflow mesh 116 and a second airflow zone, separate from the first airflow zone, through port access cutouts 110. This means both the switch chip and the pluggable optics modules receive intake air at ambient temperature. This design represents a significant improvement over conventional airflow designs where the air used to cool the switch chip air has been preheated by the pluggable optics modules.

Figure 3:
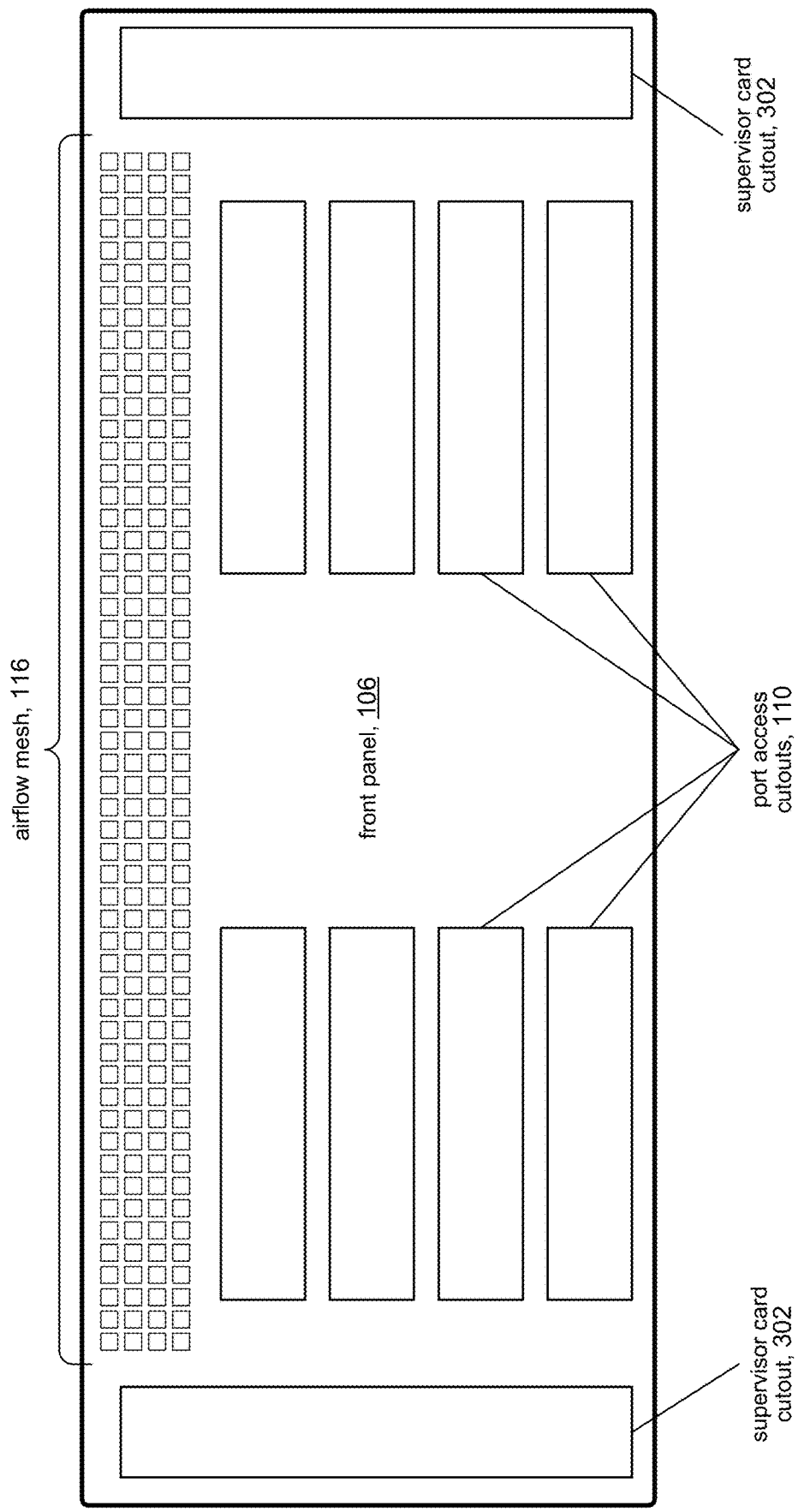
FIG. 3 is a representation of an example faceplate in accordance with the present disclosure.

FIG. 3 shows front panel 106 removed from chassis 104. The front panel has port access cutouts 110 to provide access to the POM connectors, and openings that form airflow mesh 116. Front panel 106 further includes cutouts 302 for the supervisor cards 114.

Figure 4A:
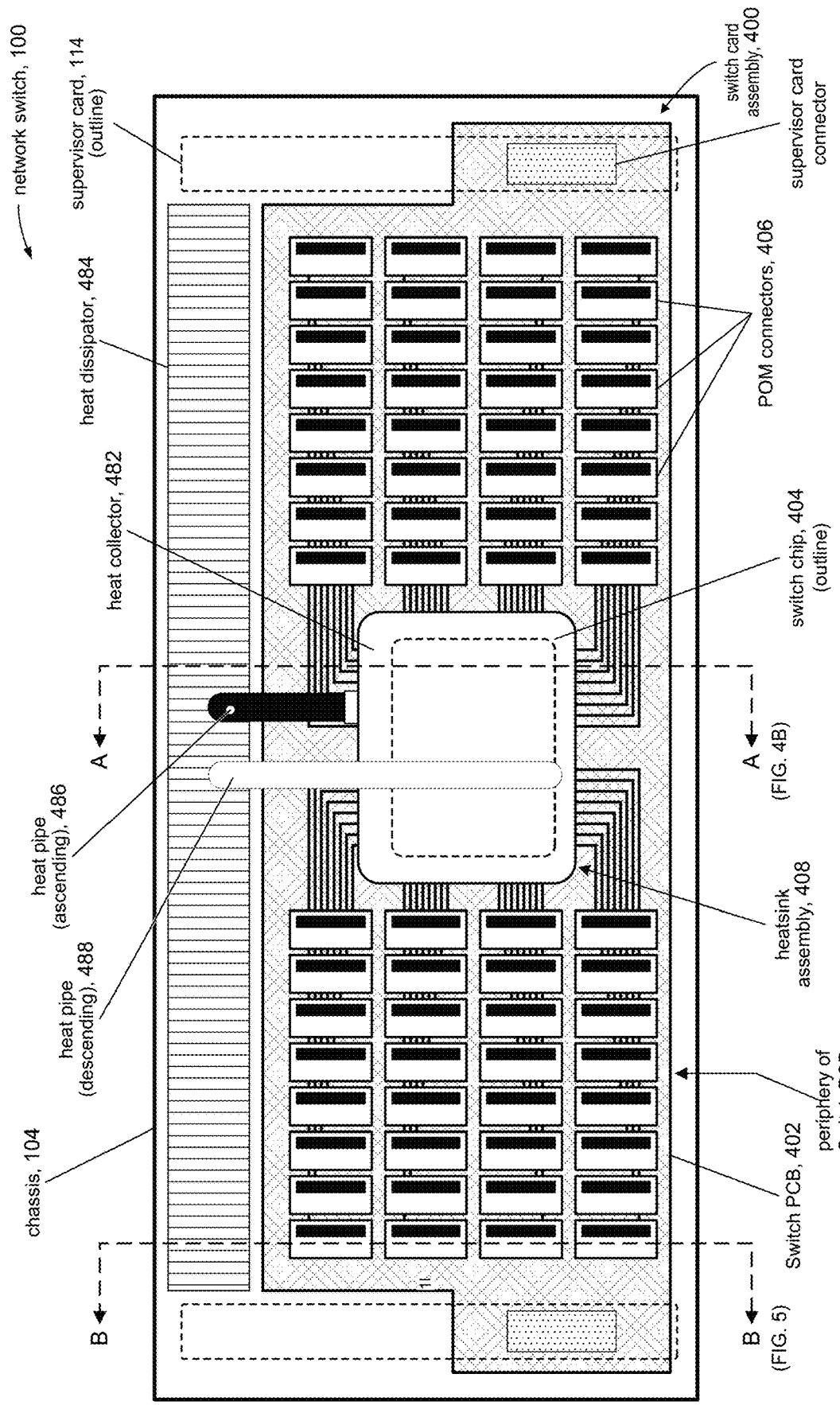
FIGS. 4A and 4B illustrate aspects of an example switch card assembly in accordance with the present disclosure.
Figure 4B:
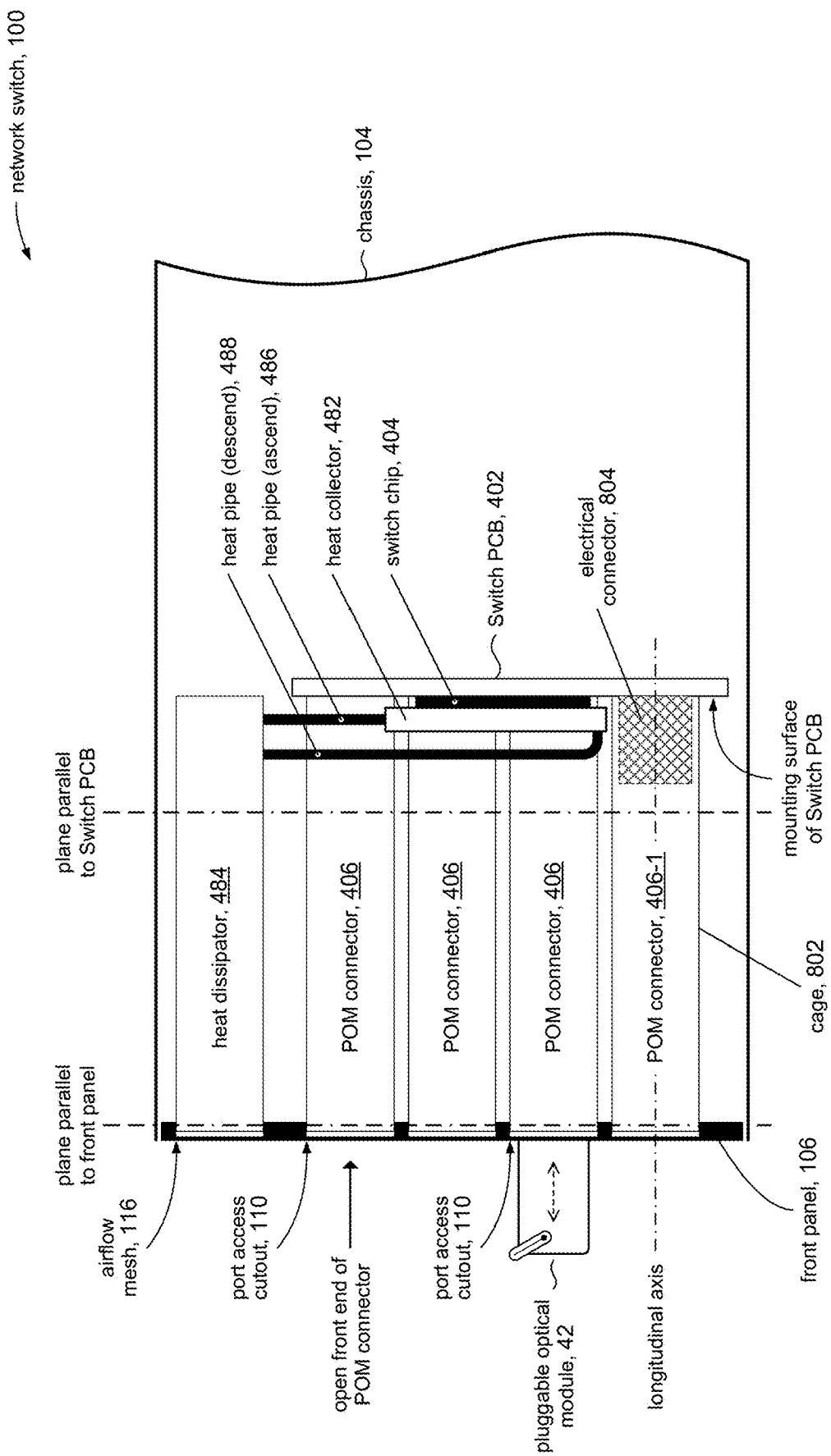

Refer now to FIGS. 4A and 4B. FIG. 4A shows the front-facing view of network switch 100, as shown in FIG. 2, but with front panel 106 removed and looking into chassis 104. FIG. 4A is a schematic representation of a switch card assembly (SCA) 400 in accordance with the present disclosure. FIG. 4B is a side view of network switch 100 showing details for the SCA 400 taken along view line A-A.

In some embodiments, SCA 400 comprises a switch printed circuit board (Switch PCB) 402 to carry switch chip 404 which provides the network data packet processing and packet forwarding functionality of network switch 100. Additional circuit components (not shown) to support the operation of switch chip 404 can also be mounted on the Switch PCB. Although these figures show a single switch chip configuration, it will be appreciated that embodiments of a switch card assembly in accordance with the present disclosure can include multiple switch chips (e.g., FIG. 13).

SCA 400 further comprises POM connectors 406 to receive pluggable optical modules. It is understood that POM connectors 406 can be configured to receive pluggable optical modules having currently available form factors such as, SFP, QSFP, QSFP-DD, OSFP, and OSFP-XD, but are not limited to such form factors. As will be shown and described in more detail below, a POM connector comprises a cage 802 (FIG. 8) to receive a pluggable optical module 42 and an electrical connector 804 that mechanically engages with and electrically connects to the pluggable optical module. The disclosed embodiments show the POM connectors oriented such that the openings are vertical, see FIGS. 4A and 8 for example. It will be appreciated that in other embodiments, the POM connectors can be rotated 90° with the openings oriented horizontally, and in general can be rotated by any angle.

In accordance with the present disclosure, POM connectors 406 are distributed across the surface of Switch PCB 402, rather than along an edge of a PCB as in conventional designs. Notably, each POM connector 406 mounts directly on the Switch PCB 402. FIG. 4A, for example, shows two 4×8 arrays of POM connectors for a total of 64 connectors mounted on the surface of Switch PCB 402. POM connectors 406 are mounted on Switch PCB 402 in orthogonal orientation relative to the surface of Switch PCB 402, with the longitudinal axis of each POM connector (e.g., 406-1, FIG. 4B) orthogonal to the plane of the Switch PCB. As such, when installed in the chassis 104, Switch PCB 402 is vertically oriented in a plane substantially parallel to front panel 106 and the open front ends of POM connectors 406 are substantially aligned with port access cutouts 110 of the front panel, as illustrated in FIG. 4B for example, to allow for the removal and installation of pluggable optical modules. The orthogonal arrangement of POM connectors 406 on the surface of Switch PCB 402 allows the connectors to be positioned closer to the switch chip, enabling shorter lengths of electrical signal traces between the switch chip and the POM connectors as compared to edge-mounted POM connector designs.

SCA 400 further comprises a heatsink assembly 408 to remove heat generated by switch chip 404. In some embodiments, for example, heatsink assembly 408 can be based on a heat removal design called a thermo-siphon. The heatsink assembly includes a heat collector 482 that is in thermal contact with switch chip 404. The heat collector is connected to a heat dissipator 484 via ascending heat pipe 486 and descending heat pipe 488. Heat dissipator 484 can be substantially aligned with airflow mesh 116 formed through front panel 106. Heatsink assembly 408 is a closed system containing a fluid that circulates between heat collector 482 and heat dissipator 484 via heat pipes 486, 488. Heat generated by switch chip 404 is absorbed by the fluid, which evaporates the fluid. The evaporated fluid rises in ascending heat pipe 486 into heat dissipator 484, where it condenses back to fluid and returns to the heat collector via descending heat pipe 488. For network switches with multiple switch chips, each switch chip would have a dedicated heatsink similar to the one described above.

In accordance with the present disclosure, the heat dissipator 484 is spaced apart from the POM connectors 406 in a vertical plane parallel to Switch PCB 402. This can be seen in the front-facing view of FIG. 4A and more explicitly in the side view of FIG. 4B. As shown FIG. 4B, in some embodiments, the front end of heat dissipator 484 and the open ends of POM connectors 406 are substantially aligned to front panel 106. It will be appreciated, however, that in other embodiments the heat dissipator can be set back from the front panel.

In accordance with embodiments of the present disclosure, SCA 400 with all its components is removable from chassis 104 as a replaceable unit from the front end of the chassis for ease of servicing the network switch.

Figure 4C:
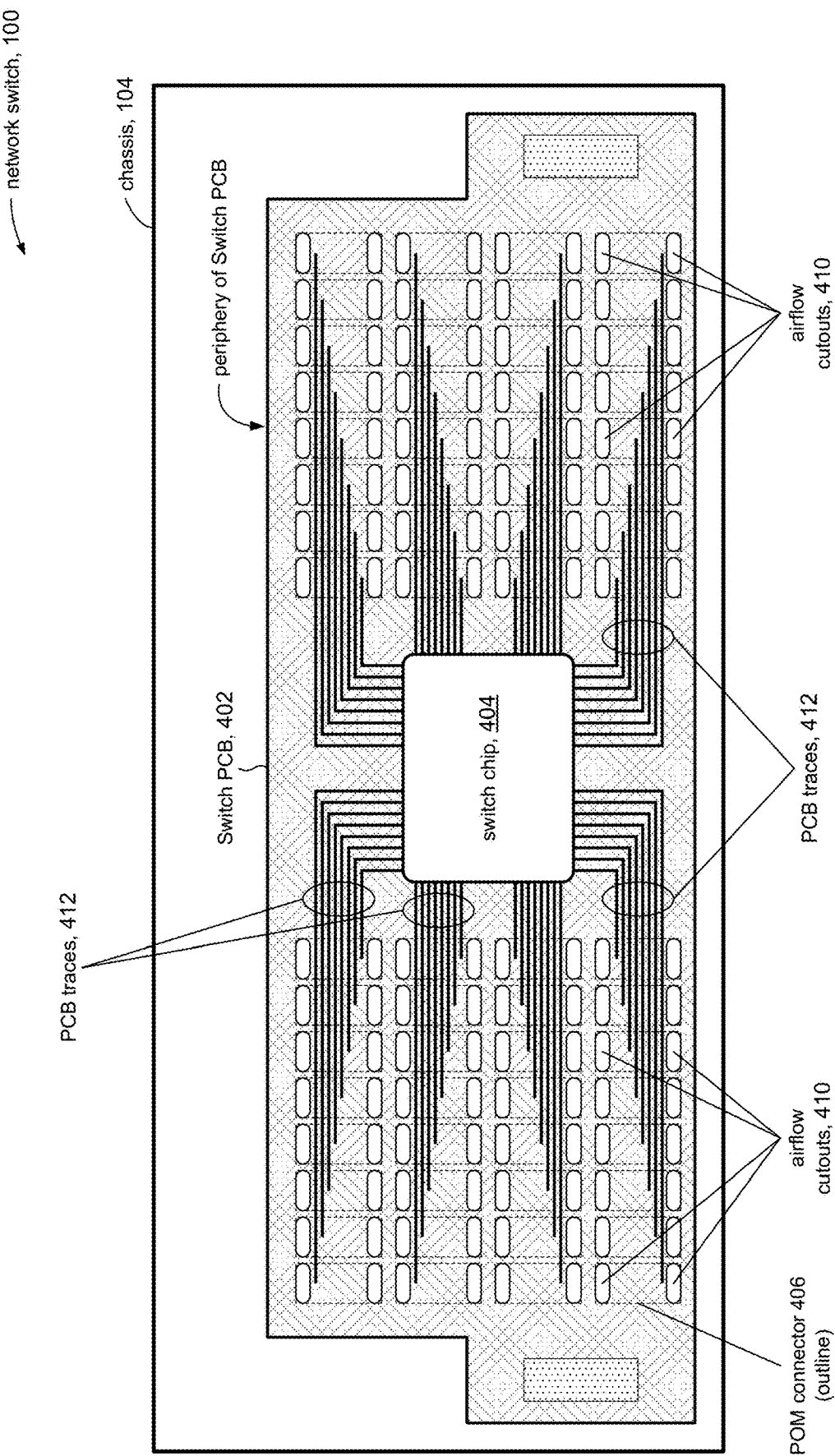
FIG. 4C illustrates details of an example switch printed circuit board in accordance with the present disclosure.
Figure 4D:
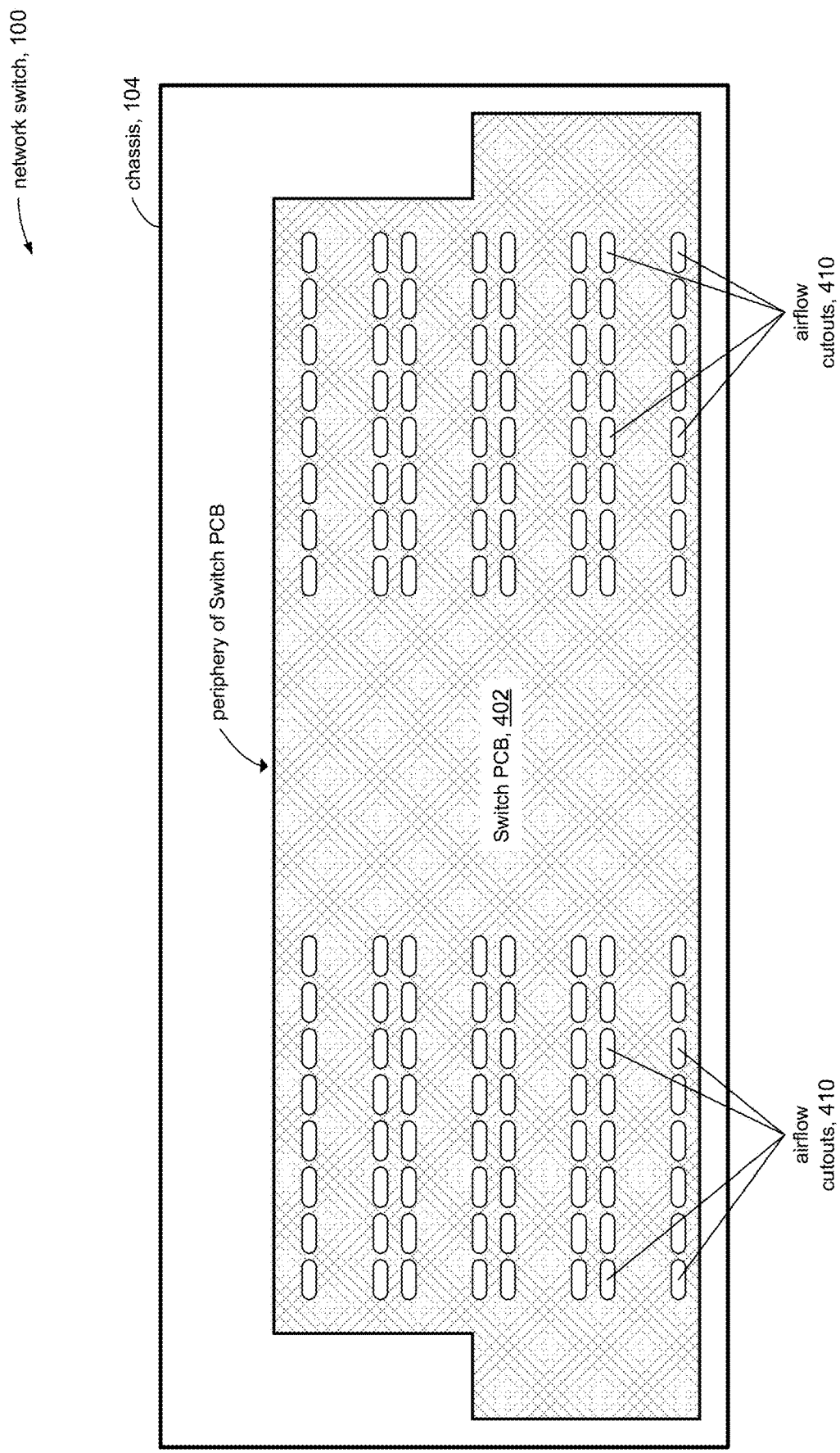
FIG. 4D illustrates additional details of an example switch printed circuit board in accordance with the present disclosure.

FIGS. 4C and 4D show SCA 400 with the POM connectors 406 and heat assembly 408 components removed, revealing additional details of Switch PCB 402. In accordance with the present disclosure, Switch PCB 402 includes connector airflow cutouts 410 that are substantially aligned with respective POM connectors 406 (shown in outline). Airflow cutouts 410 are formed through Switch PCB 402. As will be discussed in more detail below, the airflow cutouts allow for air that enters the interiors of the POM cages to flow through the Switch PCB.

FIG. 4C further shows that Switch PCB 402 includes PCB traces 412 that can be formed on top, bottom, or inner layers of the Switch PCB. It is noted that the PCB traces shown in the figure are merely schematic representations for illustration purposes. FIG. 4C, for example, shows PCB traces 412 for connecting switch chip 404 to POM connectors 406. It is understood, however, that PCB traces 412 include data lines, control lines, power buses, ground lines, and so on.

As noted above, because the POM connectors are mounted orthogonally on the switch circuit board that carries the switch chip, this surface-mounted arrangement allows for the PCB traces that connect the POM connectors to the switch chips to be sufficiently short so as to support high-speed signaling with acceptable signal loss. Layout designs in accordance with the present disclosure avoid having to use more costly off-board wiring techniques such as fly-over cable and fiber optic cables.

FIG. 4D shows Switch PCB 402 with switch chip 404 and PCB traces removed to more clearly illustrate airflow cutouts 410 formed through Switch PCB 402.

Figure 5:
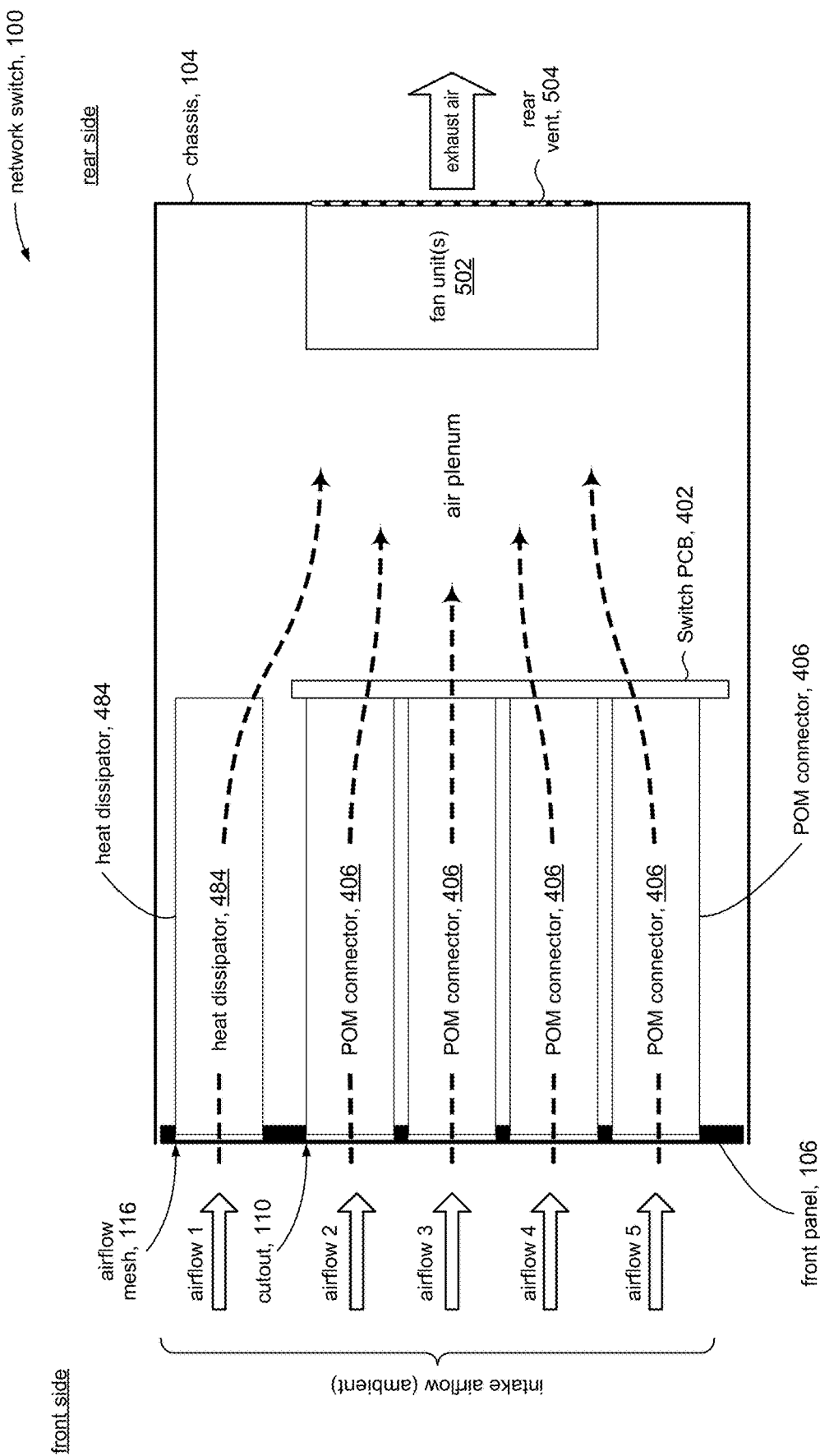
FIG. 5 is a schematic illustration of airflow through the example network switch in accordance with the present disclosure.

FIG. 5 is a side view of network switch 100 showing details for SCA 400 taken along view line B-B shown in FIG. 4A. FIG. 5 also shows additional components in network switch 100. A fan unit 502 can create a low pressure zone (relative to ambient pressure) within the interior of chassis 104 between Switch PCB 402 and the rear of the chassis. The low pressure zone creates a pressure gradient that sets up a flow of intake ambient air into chassis 104 through openings in front panel 106 toward fan unit 502. A flow of ambient air moves through openings 110, 116 in front panel 106, across heat dissipator 484 and pluggable optics modules received in POM connectors 406, into the air plenum in chassis 104, across the air plenum, and through the fans. Exhaust air can be expelled by the fans through a rear vent 504.

As illustrated in FIG. 5, openings 110, 116 formed through front panel 106 can be viewed as partitioning the intake airflow into separate zones of airflow. For example, the portion of the intake airflow that flows into and through airflow mesh 116 can be referred to as zone 1 airflow. The zone 1 airflow flows into heat dissipator 484 to remove heat produced by switch chip 404. Zone 2 airflow represents a portion of the intake airflow that flows through an access port cutout in the front panel and into the POM connector. The zone 2 airflow cools a pluggable optical module received in the POM connectors. Likewise for zone 3, 4, and 5 airflows.

Each zone of airflow receives ambient air directly from outside of network switch 100. As such, each zone of airflow provides the most effective cooling of the corresponding component because the air will not have been previously preheated by other electronic components of the network switch. Zone 1 airflow, for instance, can cool heat dissipator 484, which carries heat from switch chip 404, using ambient air. By comparison in conventional designs, the switch chip, being located within the enclosure, is cooled using air that has already picked up heat generated by the physical port electronics (e.g., pluggable optical module) and hence is less effective in removing heat generated by the switch chip.

Figure 6:
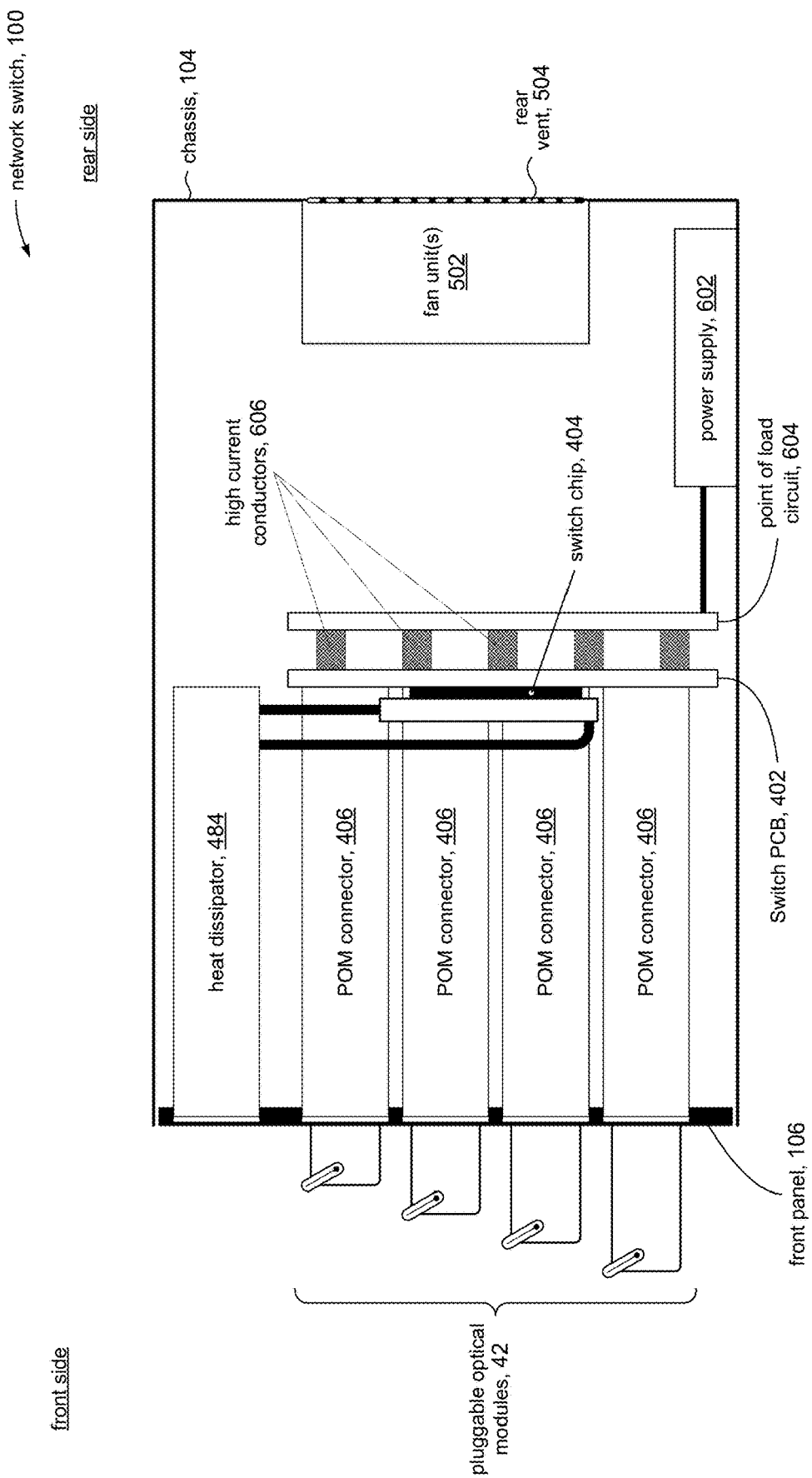
FIG. 6 is a schematic illustration of an example point of load power converter printed circuit board in accordance with the present disclosure.

FIG. 6 is a side view of network switch 100 showing additional details for SCA 400 taken along view line A-A shown in FIG. 4A. FIG. 6 also shows additional components in network switch 100. A power supply 602 converts AC power to a DC level (typically 12V DC) that is distributed to supply the various components in the network switch.

In some embodiments, SCA 400 includes a point of load (POL) circuit board 604 that receives 12V DC levels from power supply 602. POL circuit 604 can include voltage level converters to produce the DC voltage levels (e.g., 0.5V, 1.5V) required by switch chip 404, and DC voltage levels (e.g., 3.3V) for pluggable optics modules 42. POL circuit 604 can be mounted on Switch PCB 402. Power from the POL circuit can be provided to circuitry on the Switch PCB via high-current conductors 606 such as copper plugs.

In accordance with some embodiments, POL circuit 604 can include cutouts (not shown) that are substantially in alignment with airflow cutouts 410 formed through Switch PCB 402. The cutouts in POL circuit 604 prevent the blockage of airflow through the Switch PCB 402 (e.g., airflows 2-5, FIG. 5) so that airflow that cools the pluggable optical modules 42 can be exhausted out the rear side of chassis 104.

Figure 7:
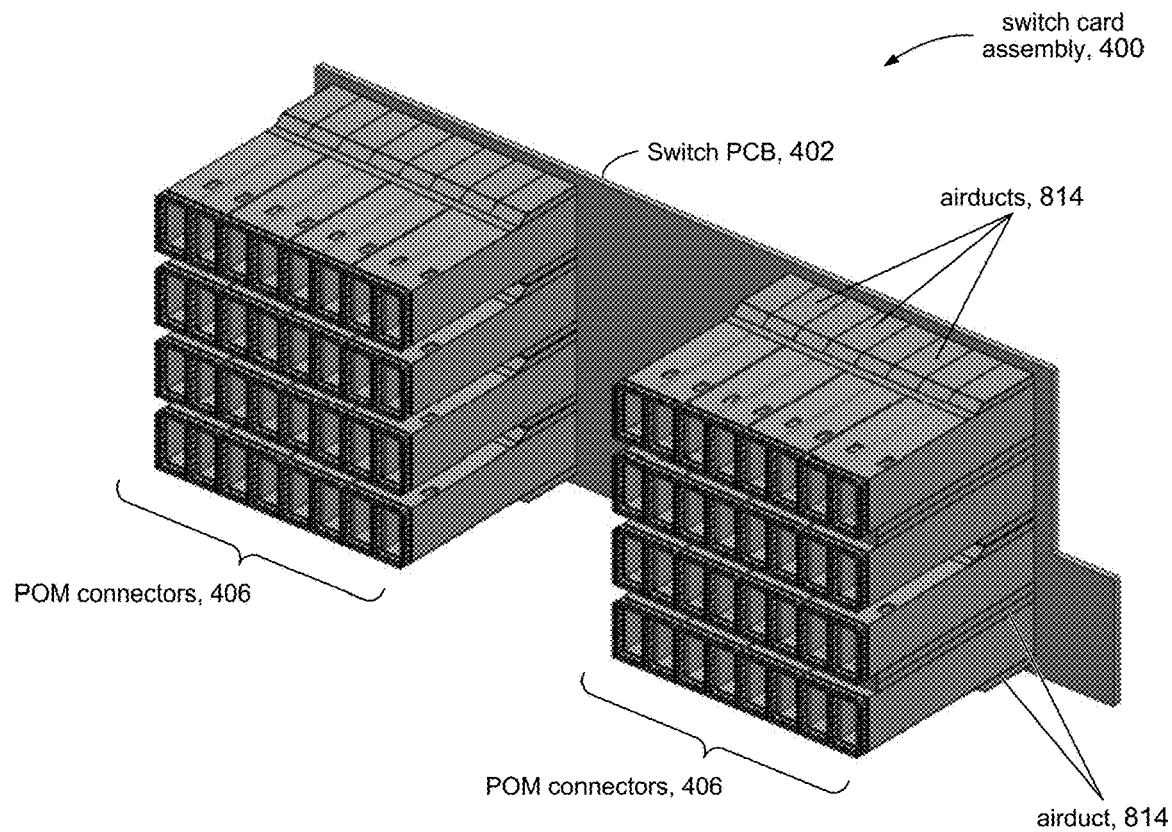
FIGS. 7 and 8 shows aspects of the example pluggable optics connectors in accordance with the present disclosure.

FIG. 7 is an isometric view of SCA 400, showing POM connectors 406 mounted on Switch PCB 402 and additional detail of the connectors. FIG. 7 illustrates two 4×8 arrays of POM connectors. It will be appreciated that in other embodiments, the POM connectors can be arranged in a single N×M array, or two or more N×M configuration of arrays where N and M can be the same or different among the arrays. In accordance with the present disclosure, each POM connector includes airducts 814 to facilitate cooling of a pluggable optical module installed in the POM connector.

Figure 8:
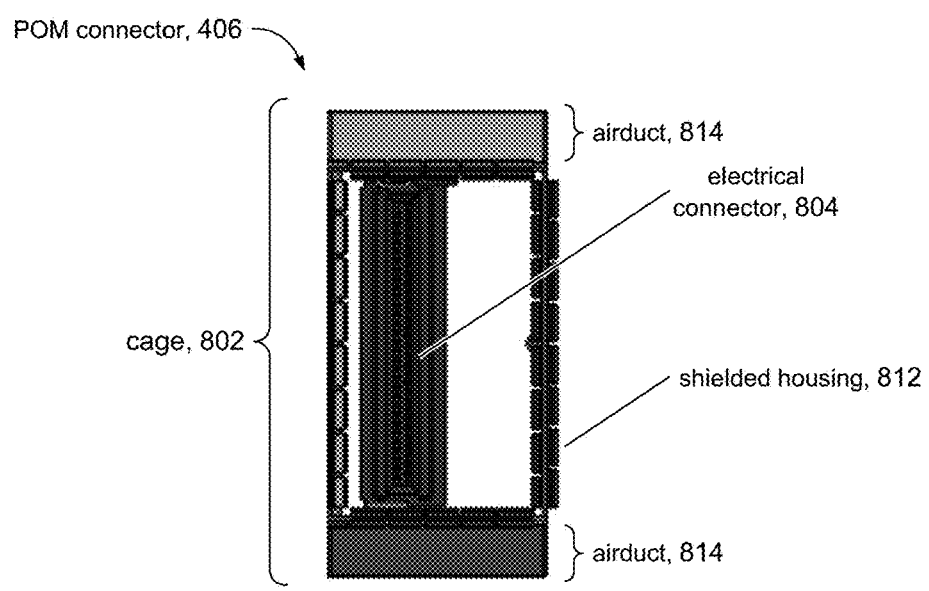

FIG. 8 is a face-on view of POM connector 406 in accordance with some embodiments. The POM connector can comprise a cage 802 and an electrical connector 804 disposed in cage 802. In some embodiments, cage 802 comprises an electromagnetically shielded housing 812 and airducts 814.

Figure 9:
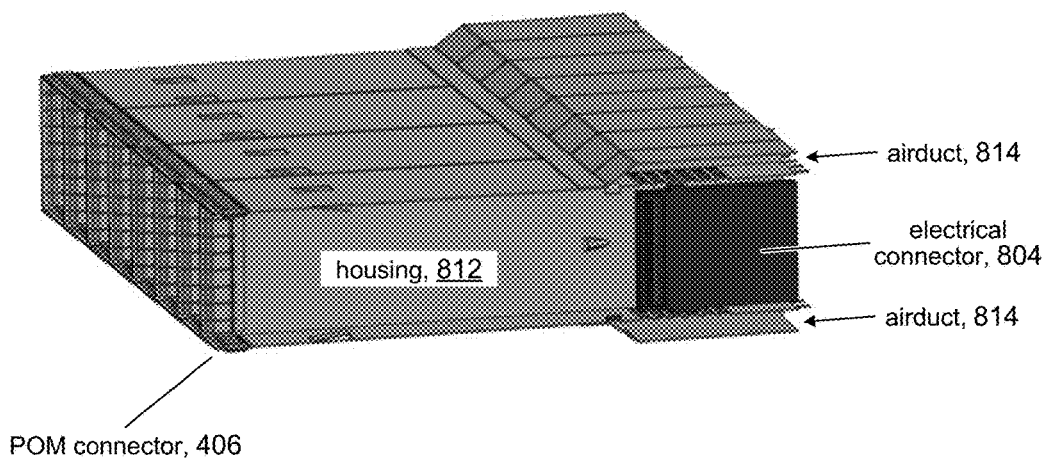
FIGS. 9 and 10 illustrate additional detail of the example pluggable optics connectors in accordance with the present disclosure.

FIG. 9 shows a cutaway view of POM connector 406, illustrating additional details in accordance with the present disclosure. The cutaway view exposes the interior of housing 812. Electrical connector 804 is disposed in the housing at the end of the housing where the POM connector mounts to Switch PCB 402.

Figure 10:
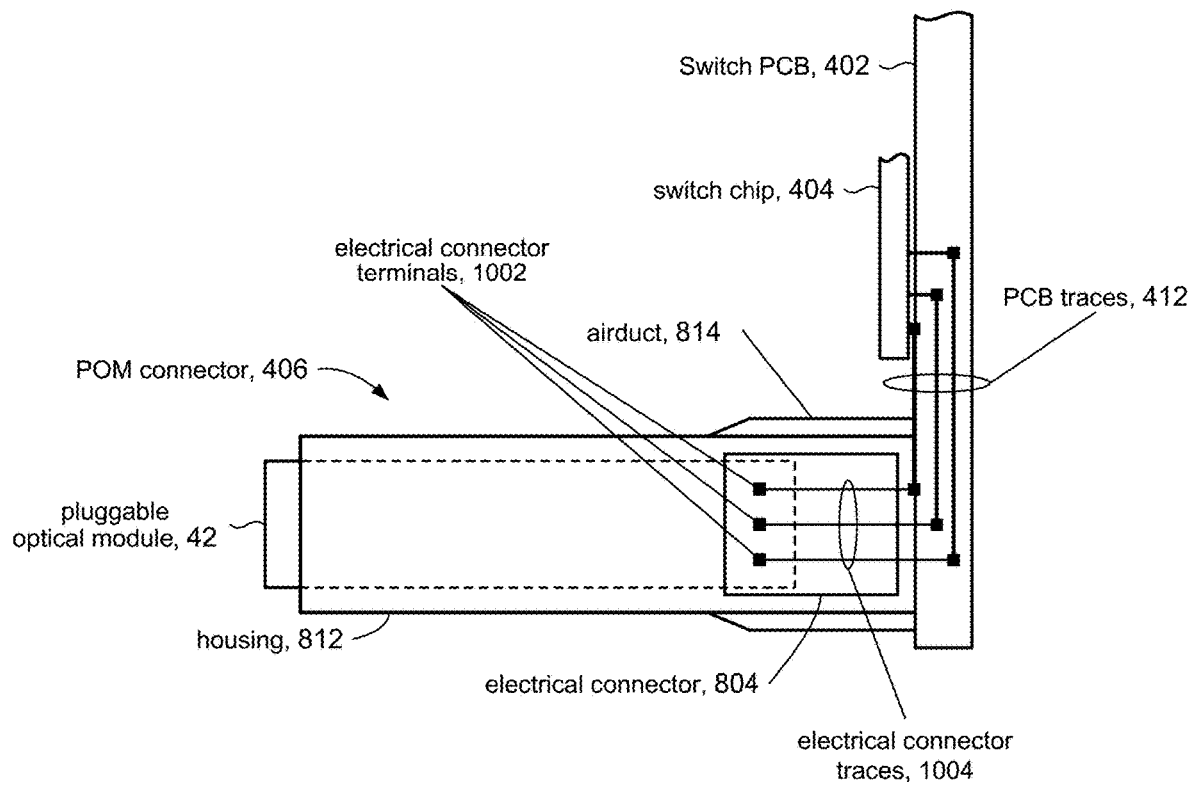

FIG. 10 is a schematic illustration that shows a pluggable optical module 42 received in POM connector 406. When pluggable optical module 42 is plugged into POM connector 406, the pluggable optical module is electrically coupled to the various electronic components carried on Switch PCB 402, including switch chip 404, power busses, ground lines, control lines, etc. In some embodiments, for example, electrical terminals (not shown) in pluggable optical module 42 can make contact with corresponding terminals 1002 on the electrical connector component 804 of POM connector 406. Traces 1004 formed on the electrical connector 804 electrically connect terminals 1002 to PCB traces 412 on Switch PCB 402. PCB traces 412, in turn, can connect to switch chip 404, power busses, ground lines, control lines, etc.

Figure 11:
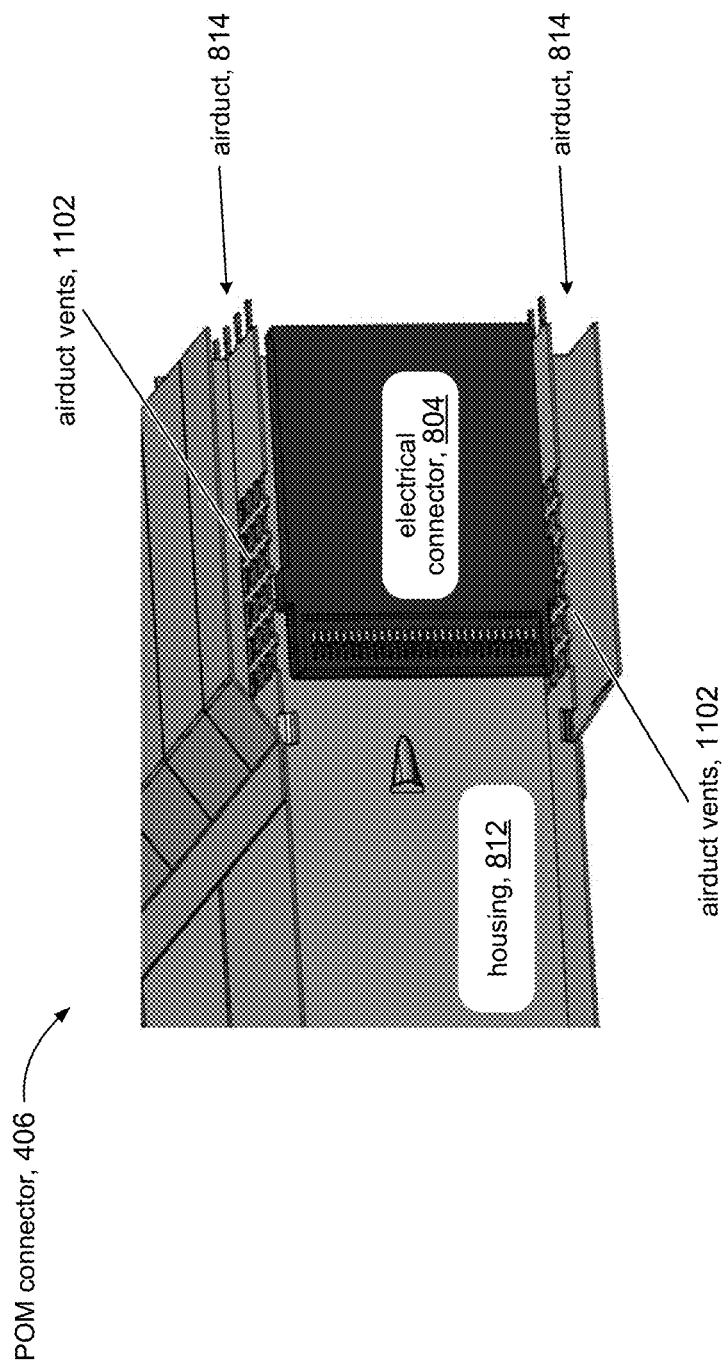
FIGS. 11 and 12 illustrate airflow through the example pluggable optics connectors in accordance with the present disclosure.
Figure 12:
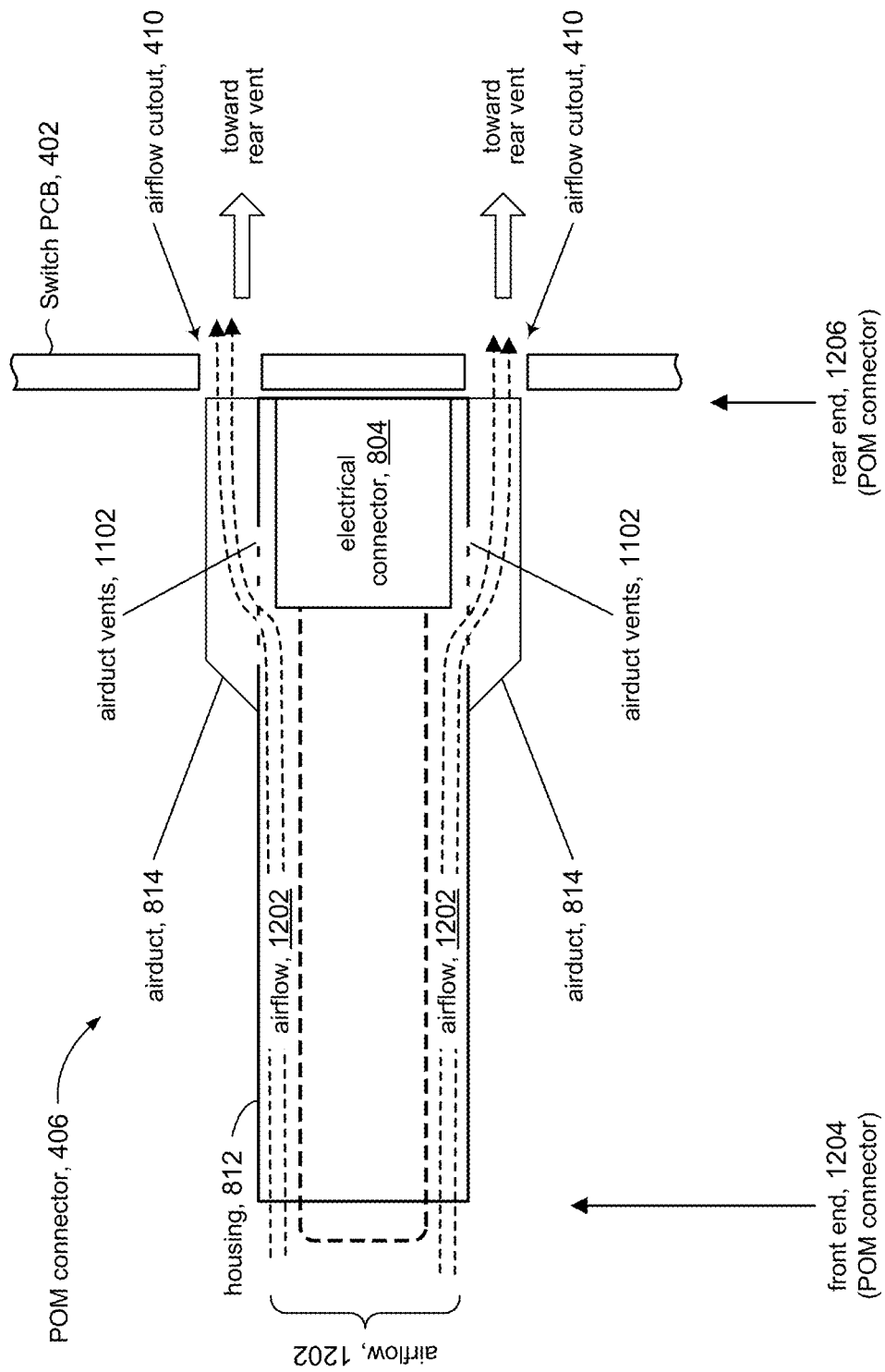

FIGS. 11 and 12 illustrate airducts 814 of POM connectors 406 in more detail. FIG. 11 is a magnified portion of the cutaway view shown in FIG. 9. In some embodiments, housing 812 includes airduct vents 1102 to provide an opening from the housing into airducts 814. Referring to FIG. 12, airflow channels (paths) 1202 in POM connector 406 are defined by housing 812, airducts 814, and vents 1102, where air can flow from the front end 1204 of the connector to the rear end 1206 of the connector. The airflow enters housing 812, continues along the length of the housing, splits into streams that enter airducts 814 via the airduct vents 1102, exits the air ducts, and continues through airflow cutouts 410 in the Switch PCB 402 which are substantially aligned with the airducts. A pluggable optical module (not shown) received in the housing can be cooled by airflows along channels 1202 passing across the pluggable optical module.

Figure 13:
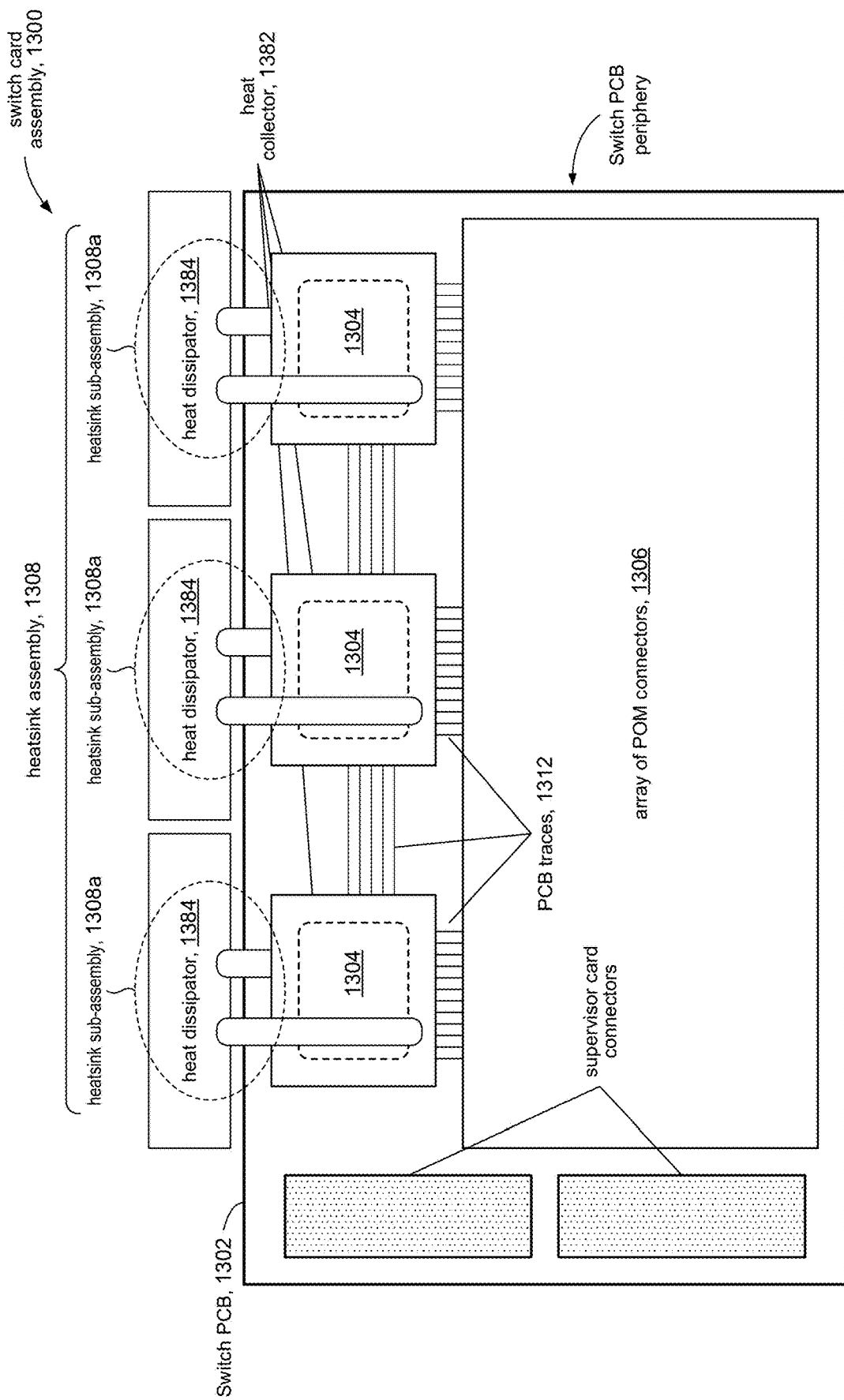
FIG. 13 is a schematic illustration of an embodiment in accordance with the present disclosure that uses multiple switch chips.

FIG. 13 represents an embodiment in accordance with the present disclosure that comprises multiple switch chips. In some embodiments, SCA 1300 carries multiple switch chips 1304. Although the figure shows a three-chip configuration, some embodiments may comprise two switch chips and still other embodiments may comprise more than three switch chips. The outlines of switch chips 1304 are shown because they lie behind respective heat collectors 1382. It will be appreciated that Switch PCB 1302 can carry additional circuitry, for example, to support switch chips 1304.

SCA 1300 further comprises an array of POM connectors 1306, where each POM connector is mounted so that its long axis is perpendicular to the plane of the Switch PCB; see, for example, FIG. 4B. The POM connector array can contain a suitable number of POM connectors, depending on the switching capacity of the switch chips. Merely to illustrate this point, for example, the array 1306 may contain 128 POM connectors arranged in an 8 row ×16 column pattern.

SCA 1300 further comprises PCB traces 1312 to create electrical paths between the POM connectors and switch chips 1304. When a pluggable optical module (e.g., 42) is received in one of the POM connectors, the pluggable optical module can be electrically coupled to the switch chips by way of the PCB traces. As noted above, PCB traces 1312 comprise traces printed on or otherwise formed on top, bottom, and/or among conductive layers of a multi-layered printed circuit board.

SCA 1300 further comprises heatsink assembly 1308 comprising several heatsink sub-assemblies 1308a, 1308b, 1308c, one heatsink sub-assembly for each switch chip. Each heatsink sub-assembly comprises a respective heat collector 1382 in thermal contact with a respective switch chip 1304 and connected to a respective heat dissipator 1384 to dissipate heat generated by that switch chip. In accordance with the present disclosure, heat dissipators 1384 can be arranged at or about the periphery of Switch PCB 1302 (see also, FIG. 4A). Both the POM connectors and the heat dissipators are exposed through separate openings in the front panel of a network switch when the SCA 1300 is installed in the network switch. When a flow of intake air is created (e.g., by operation of fans in the network switch) the intake airflow will include zones of airflow that flow into the heat dissipators and separate zones of airflow that flow into the POM connectors.

This arrangement improves cooling of switch chips 1304 and pluggable optics modules received in POM connectors 1306 by segregating the airflow between the heat dissipators and the pluggable optics modules. The optics modules can be cooled with air flowing through POM connectors 1306 and cutouts (e.g., FIG. 4C) in Switch PCB 1302 to the air plenum behind the SCA (e.g., FIG. 5). Switch chips 1304 can be cooled by heat collectors 1382 attached to respective switch chips 1304, which transfer heat produced by the switch chips to heat dissipators 1384 mounted at the periphery (e.g., above, below, to the sides) of Switch PCB 1302. This arrangement supplies the heat dissipators with air at ambient temperature which significantly improves the cooling performance for the switch chip as compared to conventional designs.

It will be appreciated that persons of ordinary skill will understand the cooling of the switch chips can be accomplished by any suitable cooling mechanism. For example, although not shown, in some embodiments the cooling of the switch chips on the switch card assembly can be performed with cold-plates attached to the switch chips that use a circulating fluid to transport the heat from the switch chips to an external heat exchanger, either to air or chilled water.

Further Examples

In accordance with the present disclosure, a network switch comprises an enclosure comprising a housing and a front panel and a switch card assembly. The switch card assembly comprises: a switch printed circuit card (PCB) arranged vertically within the housing in parallel relation to the front panel; one or more switch chips mounted on the Switch PCB; an array of optical module connectors mounted on the Switch PCB; and the Switch PCB having a plurality of PCB traces that connect the one or more switch chips to the array of optical module connectors, wherein, when optical modules are received in the array of optical module connectors, the optical modules are electrically coupled to the one or more switch chips via the plurality of PCB traces, wherein the optical module connectors are mounted orthogonal to the Switch PCB and a front end of each of the optical module connectors is accessible through the front panel of the network switch.

In some embodiments, the optical module connectors are configured to receive one or more optical modules that conform to one or more of an Octal Small Form factor Pluggable (OSFP) form factor, an OSFP extended density (OSFP-XD) form factor, a Quad Small Form factor Pluggable (QSFP) form factor, or a QSFP double density (QSFP-DD) form factor.

In some embodiments, each optical module connector ("connector") among the array of optical module connectors, includes an airflow channel between the front end of the connector and a back end of the connector, wherein the Switch PCB includes an airflow cutout substantially aligned with each airflow channel at the back end of the connector. In some embodiments, the network switch further comprises a power converter printed circuit board (PCB) connected in parallel to the switch printed circuit board with a plurality of conductors to deliver power from the power converter PCB to the Switch PCB, wherein the power converter PCB includes airflow cutouts substantially aligned with the airflow cutouts in the Switch PCB.

In some embodiments, the network switch further comprises a heatsink assembly in thermal contact with the one or more switch chips, the heatsink assembly including a heat dissipator having a front side exposed through openings of the front panel to ambient air that is available to be drawn in to cool the heat dissipator without being preheated by heat-generating electronic components contained in the network switch. In some embodiments, the network switch further comprises a fan unit configured to create an airflow that draws ambient air through the openings of the front panel and contacts the heat dissipator without being heated by the optical modules or electronic components on the switch card assembly.

In some embodiments, the network switch further comprises cold plates thermally coupled to the one or more switch chips, wherein a circulating liquid is used in the cold plates to remove heat generated by the one or more switch chips.

In some embodiments, the switch card assembly with all its components is removable as a replaceable unit from the front panel for ease of servicing.

In accordance with the present disclosure, a switch card assembly comprises: a switch printed circuit board (PCB); at least one switch chip mounted on the Switch PCB; a plurality of optical module connectors are mounted on the Switch PCB within a periphery of the Switch PCB, each optical module connector ("connector") having an airflow channel between a first end of the connector and a back end of the connector, wherein an area of the Switch PCB on which the connector is mounted includes a corresponding cutout substantially aligned with the airflow channel at the back end of the connector; and the Switch PCB having a plurality of PCB traces that electrically connect the at least one switch chip to the plurality of optical module connectors, wherein the first ends of the optical module connectors and a first end of the heat dissipator are in spaced apart relation along a plane parallel to the Switch PCB, wherein when the first ends of the optical module connectors and the first end of the heat dissipator are exposed to an ambient airflow, a first portion of the ambient airflow enters the first ends of the optical module connectors, and a second portion of the ambient airflow that is separate from the first portion enters the first end of the heat dissipator.

In some embodiments, the switch card assembly further includes a heatsink assembly comprising a heat collector in thermal contact with the at least one switch chip and a heat dissipator disposed at the periphery of the Switch PCB and in thermal communication with the heat collector.

In some embodiments, the heatsink assembly further comprises a second heat collector in thermal contact with a second switch chip and a second heat dissipator disposed at the periphery of the Switch PCB and in thermal communication with the second heat collector.

In some embodiments, the plurality of optical module connectors are arranged in an N×M array, where N and M are both greater than one.

In some embodiments, the plurality of optical module connectors are arranged in two or more arrays.

In some embodiments, the plurality of optical module connectors are vertically spaced apart from the heat dissipator in a direction parallel to a major surface of the Switch PCB.

In some embodiments, the switch card assembly further includes a power PCB disposed in parallel relation to the Switch PCB and a plurality of conductors sandwiched between the power PCB and Switch PCB to deliver power from the power PCB to the Switch PCB, wherein the power PCB includes cutouts substantially aligned with the cutouts in the Switch PCB. In some embodiments, when flows of air enter the first ends of the plurality of optical module connectors, the flows of air pass through the corresponding air channels to the back ends of the plurality of optical module connectors and through the corresponding cutouts on the Switch PCB.

In accordance with the present disclosure, a network switch comprises: an enclosure comprising a housing and a front panel; a switch card assembly vertically arranged within the housing in parallel relation to the front panel; and a fan unit configured to create a flow of ambient air (airflow) that enters through the front panel to cool components of the switch card assembly, and exits a rear vent on the housing. The switch card assembly comprises: a switch printed circuit board (PCB); at least one switch chip mounted on the Switch PCB; a plurality of connectors mounted within a periphery of and on the Switch PCB and oriented to receive optical modules along a direction perpendicular to the Switch PCB, each connector having an airflow channel between a front end of the connector and a back end of the connector, wherein an area of the Switch PCB on which the connector is mounted includes a corresponding airflow cutout substantially aligned with the airflow channel at the back end of the connector; PCB traces that electrically connect the at least one switch chip to the plurality of connectors, such that the at least one switch chip is electrically connected to the optical modules when the optical modules are received among the plurality of connectors; and a heatsink assembly comprising a heat collector coupled to a heat dissipator, the heat collector in thermal contact with the at least one switch chip, the heat dissipator disposed at the periphery of the Switch PCB, the front panel having a plurality of cutouts substantially in alignment with the plurality of connectors and an air mesh substantially in alignment with the heat dissipator, wherein the airflow comprises a first portion that flows through the plurality of cutouts and into the plurality of connectors and a second portion separate from the first portion that flows through the air mesh and into the heat dissipator.

In some embodiments, the plurality of connectors are mounted on a surface of the Switch PCB.

In some embodiments, the second portion of the airflow flows into the heat dissipator without first contacting other heat-generating electronic components in the network switch.

In some embodiments, the network switch further comprises a power PCB disposed in parallel relation to the Switch PCB and a plurality of conductors to deliver power from the power PCB to the Switch PCB, wherein the power PCB includes cutouts substantially aligned with the airflow cutouts in the Switch PCB.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:
1. A network switch comprising:
an enclosure comprising a housing and a front panel; and
a switch card assembly comprising:
 a switch printed circuit board (PCB) arranged vertically within the housing in parallel relation to the front panel;
 one or more switch chips mounted on the Switch PCB;
 an array of optical module connectors, each of the optical module connectors comprising a housing mounted on the Switch PCB and configured to receive a pluggable optical module; and
 the Switch PCB having a plurality of PCB traces that connect the one or more switch chips to the array of optical module connectors, wherein, when optical modules are received in the array of optical module connectors, the optical modules are electrically coupled to the one or more switch chips via the plurality of PCB traces, wherein the optical module connectors are mounted orthogonal to the Switch PCB and a front end of each of the optical module connectors is accessible through the front panel of the network switch.

2. The network switch of claim 1, wherein the housings of the optical module connectors are configured to receive pluggable optical modules that conform to one or more of an Octal Small Form factor Pluggable (OSFP) form factor, an OSFP extended density (OSFP-XD) form factor, a Quad Small Form factor Pluggable (QSFP) form factor, or a QSFP double density (QSFP-DD) form factor.

3. The network switch of claim 1, wherein the housing of each optical module connector, includes an airflow channel between the front end of the housing and a back end of the housing, wherein the Switch PCB includes an airflow cutout substantially aligned with each airflow channel at the back end of the housing.

4. The network switch of claim 3, further comprising a power converter printed circuit board (PCB) connected in parallel to the switch printed circuit board with a plurality of conductors to deliver power from the power converter PCB to the Switch PCB, wherein the power converter PCB includes airflow cutouts substantially aligned with the airflow cutouts in the Switch PCB.

5. The network switch of claim 1, further comprising a heatsink assembly in thermal contact with the one or more switch chips, the heatsink assembly including a heat dissipator having a front side exposed through openings of the front panel to ambient air that is available to be drawn in to cool the heat dissipator without being preheated by heat-generating electronic components contained in the network switch.

6. The network switch of claim 5, further comprising a fan unit configured to create an airflow that draws ambient air through the openings of the front panel and contacts the heat dissipator without being heated by pluggable optical modules received in the optical module connectors or electronic components on the switch card assembly.

7. The network switch of claim 1, further comprising cold plates thermally coupled to the one or more switch chips, wherein a circulating liquid is used in the cold plates to remove heat generated by the one or more switch chips.

8. The network switch of claim 1, wherein the switch card assembly with all its components is removable as a replaceable unit from the front panel for ease of servicing.

9. A switch card assembly comprising:
a switch printed circuit board (PCB);
at least one switch chip mounted on the Switch PCB;
a plurality of optical module connectors are mounted on the Switch PCB within a periphery of the Switch PCB, each optical module connector ("connector") having an airflow channel between a first end of the connector and a back end of the connector, wherein an area of the Switch PCB on which the connector is mounted includes a corresponding cutout substantially aligned with the airflow channel at the back end of the connector;
a heat dissipator disposed at the periphery of the Switch PCB; and
the Switch PCB having a plurality of PCB traces that electrically connect the at least one switch chip to the plurality of optical module connectors,
wherein the first ends of the optical module connectors and a first end of the heat dissipator are in spaced apart relation along a plane parallel to the Switch PCB, wherein when the first ends of the optical module connectors and the first end of the heat dissipator are exposed to an ambient airflow, a first portion of the ambient airflow enters the first ends of the optical module connectors, and a second portion of the ambient airflow that is separate from the first portion enters the first end of the heat dissipator.

10. The switch card assembly of claim 9, further including a heatsink assembly comprising a heat collector in thermal contact with the at least one switch chip and the heat dissipator.

11. The switch card assembly of claim 10, wherein the heatsink assembly further comprises a second heat collector in thermal contact with a second switch chip and a second heat dissipator disposed at the periphery of the Switch PCB and in thermal communication with the second heat collector.

12. The switch card assembly of claim 9, wherein the plurality of optical module connectors are arranged in an N×M array, where N and M are both greater than one.

13. The switch card assembly of claim 9, wherein the plurality of optical module connectors are arranged in two or more arrays.

14. The switch card assembly of claim 9, wherein the plurality of optical module connectors are vertically spaced apart from the heat dissipator in a direction parallel to a major surface of the Switch PCB.

15. The switch card assembly of claim 9, further comprising a power PCB disposed in parallel relation to the Switch PCB and a plurality of conductors sandwiched between the power PCB and Switch PCB to deliver power from the power PCB to the Switch PCB, wherein the power PCB includes cutouts substantially aligned with the cutouts in the Switch PCB.

16. The switch card assembly of claim 9, wherein, when flows of air enter the first ends of the plurality of optical module connectors, the flows of air pass through the corresponding air channels to the back ends of the plurality of optical module connectors and through the corresponding cutouts on the Switch PCB.

17. A network switch comprising:
an enclosure comprising a housing and a front panel;
a switch card assembly vertically arranged within the housing in parallel relation to the front panel; and
a fan unit configured to create a flow of ambient air (airflow) that enters through the front panel to cool components of the switch card assembly, and exits a rear vent on the housing,
the switch card assembly comprising:
a switch printed circuit board (PCB);
at least one switch chip mounted on the Switch PCB;
a plurality of connectors mounted within a periphery of and on the Switch PCB and oriented to receive optical modules along a direction perpendicular to the Switch PCB, each connector having an airflow channel between a front end of the connector and a back end of the connector, wherein an area of the Switch PCB on which the connector is mounted includes a corresponding airflow cutout substantially aligned with the airflow channel at the back end of the connector;
PCB traces that electrically connect the at least one switch chip to the plurality of connectors, such that the at least one switch chip is electrically connected to the optical modules when the optical modules are received among the plurality of connectors; and a heatsink assembly comprising a heat collector coupled to a heat dissipator, the heat collector in thermal contact with the at least one switch chip, the heat dissipator disposed at the periphery of the Switch PCB, the front panel having a plurality of cutouts substantially in alignment with the plurality of connectors and an air mesh substantially in alignment with the heat dissipator, wherein the airflow comprises a first portion that flows through the plurality of cutouts and into the plurality of connectors and a second portion separate from the first portion that flows through the air mesh and into the heat dissipator.

18. The network switch of claim 17, wherein the plurality of connectors are mounted on a surface of the Switch PCB.

19. The network switch of claim 17, wherein the second portion of the airflow flows into the heat dissipator without first contacting other heat-generating electronic components in the network switch.

20. The network switch of claim 17, further comprising a power PCB disposed in parallel relation to the Switch PCB and a plurality of conductors to deliver power from the power PCB to the Switch PCB, wherein the power PCB includes cutouts substantially aligned with the airflow cutouts in the Switch PCB.

* * * * *